Jan. 4, 1949. H. IRWIN 2,458,472
JAW GRINDING MECHANISM FOR CAR WHEEL BORING MILLS
Filed May 24, 1945 3 Sheets-Sheet 2
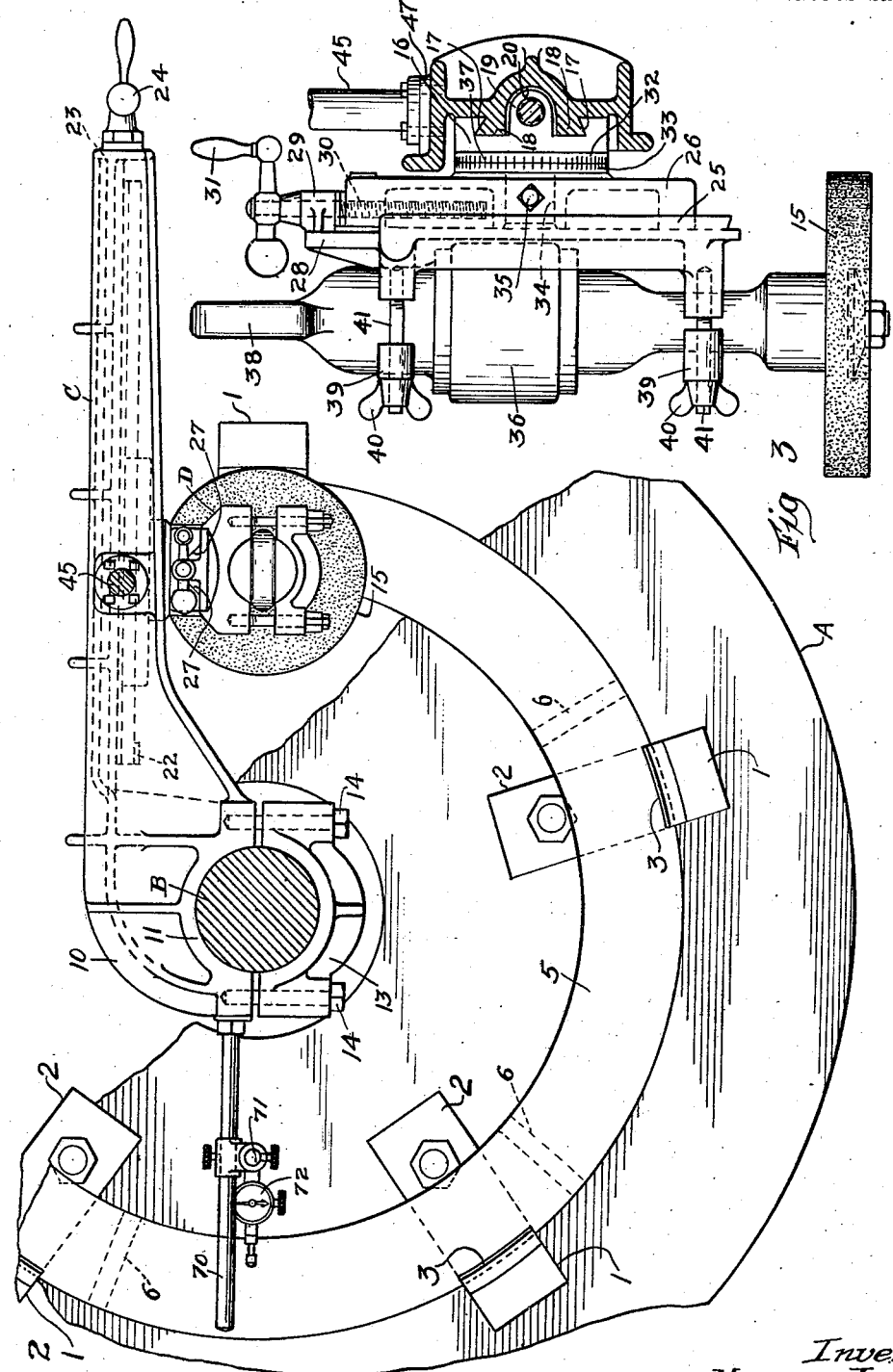
Inventor
Henry Irwin.
By George J. Haight
Atty.

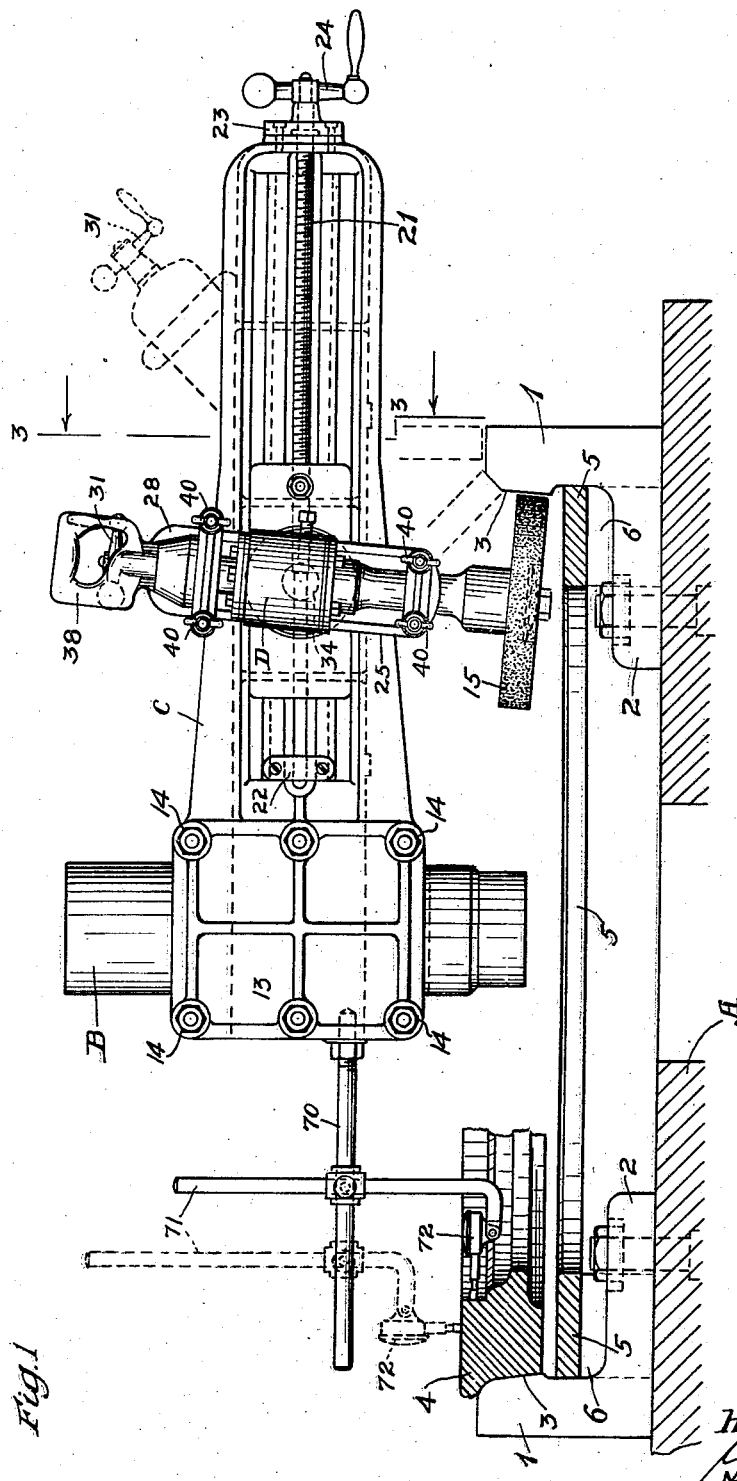

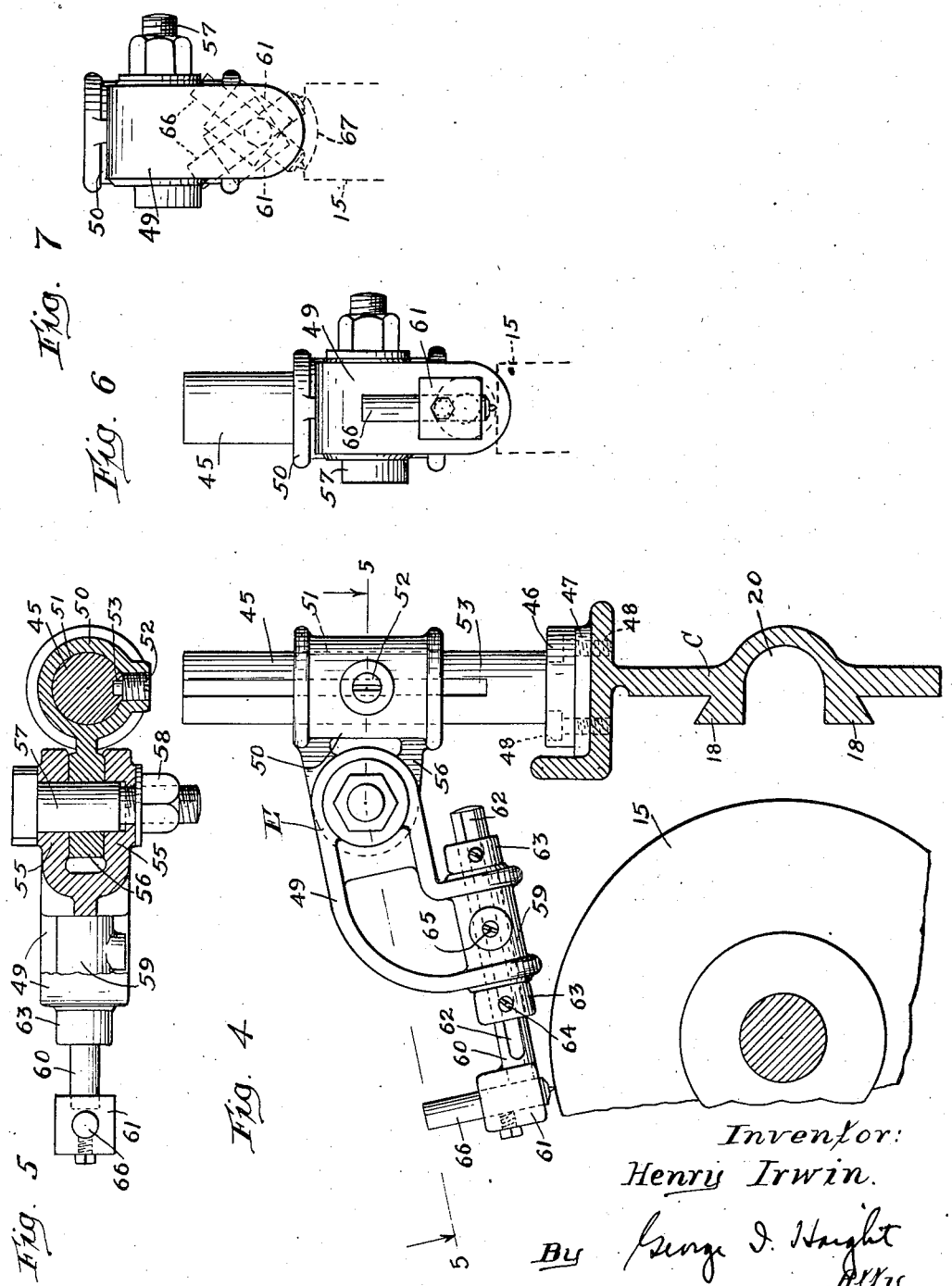

Patented Jan. 4, 1949

2,458,472

UNITED STATES PATENT OFFICE 2,458,472

JAW GRINDING MECHANISM FOR CAR WHEEL BORING MILLS

Henry Irwin, Chicago, Ill., assignor to General American Transportation Corporation, Chicago, Ill., a corporation of New York Application May 24, 1945, Serial No. 595,539

4 Claims. (Cl. 51—241)

This invention relates to improvements in portable machine tools and particularly to a machine for grinding the clutch or chuck jaws of car wheel boring machines.

One of the objects of the invention is to provide a portable unitary machine of this character which can be mounted on the boring machine to operate on the jaws thereof while they are in place and without the necessity of disassembling or otherwise changing or disturbing the normal operating adjustment of the parts of the boring machine.

Another object of the invention is to provide a portable self-contained machine adapted for convenient attachment to a car wheel boring machine and which, in cooperation with the boring machine itself, will grind and true up the chuck jaws of the boring machine to maintain the accuracy of that machine.

Another object is to provide a machine of this character having a power driven grinding wheel carried on an arm mounted on the boring machine and adapted for universal adjustment with respect to the jaws to be faced or ground.

Another object is to provide an attachment mounted on the support for the grinding mechanism, as a part of the self-contained unit, for dressing the grinding wheel itself.

These and other objects of the invention will appear from the following description in connection with the accompanying drawings which illustrate one embodiment of the invention and in which Fig. 1 is a view in elevation of a grinding machine mounted upon the boring bar of the boring machine in grinding position with respect to the jaws, this view illustrating a portion of the boring machine table and chuck jaws mounted thereon;

Fig. 2 is a plan view of the structure shown in Fig. 1, the boring machine table and jaws thereon being illustrated in a fragmentary view of the whole table;

Fig. 3 is an enlarged vertical sectional view on the line 3—3 of Fig. 1, illustrating the motor driven grinding wheel and its adjustable carriage mounting on the main supporting arm;

Fig. 4 is an enlarged view in elevation of the grinding wheel dressing tool attachment mounted upon the main carrying arm of the machine, this arm being shown in section;

Fig. 5 is a detail sectional view substantially on the line 5—5 of Fig. 4;

Fig. 6 is an enlarged end view of the wheel dressing attachment in position to dress the peripheral face of the grinding wheel; and Fig. 7 is a view similar to Fig. 6 showing the manner in which the dressing tool can be manipulated to dress or cut a grooved surface on the grinding wheel.

Railway car wheels have a center bore by which they are mounted on the axles. The center bore in the wheel must be exactly concentric with respect to the wheel periphery, and the axis thereof must be exactly normal to the plane of the wheel so that the wheel will run exactly true on the rails. The practice is to cut the central bore in a vertical boring mill or machine in which the car wheel is laid horizontally on a rotary table A and the bore cut therein by suitable boring tool mounted upon a vertically disposed boring bar B which is non-rotatable but vertically or axially adjustable to position the boring tool with respect to the wheel. The car wheel is clamped firmly on the table by clutch or chuck jaws 1, generally five in number, equally spaced around the table, which engage the periphery of the car wheel and which are radially movable toward and from the wheel periphery for clamping the wheel and for opening the jaws to permit the placing or removal of the wheels from the machine. This is standard construction for boring machines of this type, and hence it is unnecessary to illustrate more of this machine than those parts with which the application of my grinding mechanism is concerned.

The chuck jaws of the boring mill comprise generally vertical posts having horizontal legs 2 by which they slide radially on the face of the table, this operation of opening and closing the jaws being generally performed automatically by mechanism which is a part of the boring mill. The gripping faces 3 of these jaws are usually curved on an arc corresponding to the diameter of the car wheel, and are also formed curved to conform to the contour of the wheel tread.

It is the general practice to use a gauge ring to test the accuracy of the chuck jaws with respect to concentricity and level. This gauge ring has the peripheral contour of the car wheel, together with the proper diameter and other dimensions to which the car wheels must conform. A portion 4 of one of these gauge rings is shown in section at the left-hand side of Fig. 1, to illustrate its use in gauging the accuracy of the clutch jaws, but it is understood, of course, that this ring is not in place when the jaw faces are ground.

As before mentioned, the chuck jaws of this type of boring machine are automatically moved radially to clamp the wheel which is being bored. When the jaws are faced or ground, however, there is no wheel in place for the jaws to grip and it is necessary therefore to hold the jaws in position corresponding to their normal operating position. I provide a flat ring 5 for this purpose, which is substantially the diameter of a car wheel and which is placed in position to be gripped by the jaws for holding them in true circular position while they are being ground. This holding ring 5, as shown in Figs. 1 and 2, is flat and is positioned to be engaged by the jaws below the wheel gripping faces 3 thereof, so as not to interfere with the grinding operation. A plurality of spacer blocks 6 are provided and distributed around the table for supporting the holding ring in proper level position. Both the holding ring and the blocks 6 are, of course, removed when the jaw grinding operation is completed.

The chuck jaws in a boring machine of this type are subjected to hard usage and are frequently damaged, particularly the gripping faces thereof. It becomes necessary, therefore, from time to time, to re-grind them in order to restore them to accuracy.

In accordance with my invention, the machine shown in the drawings is arranged to be conveniently attached to the boring machine and to accurately grind the jaws in place and without disassembling the boring machine or changing its setup in any respect.

The machine in general comprises a horizontally disposed main supporting arm C upon which the motor driven grinding unit D is mounted and upon which also is mounted the grinding wheel dressing attachment E. The whole mechanism is carried by this arm which is arranged to be mounted upon the vertical boring bar B of the boring machine and thereby held in fixed position with respect to jaws to be ground.

This supporting arm has an enlarged end portion 10 somewhat elongated vertically and forms part 11 of a clamping member. The other part of the clamp is formed by the cap member 13, both of these clamp members being clamped upon the boring bar by the bolts 14. Both of these clamp members are provided with half round grooves which embrace the boring bar. In practice, the grooves can be made to fit a boring bar of a given size, and if the machine is to be used on boring bars of smaller size shims can be used. The carrying arm is so formed, as shown in the drawings, that it is offset from the axis of the boring bar sufficiently so that the axis of the grinding wheel 15 lies in a plane which is radial to the boring bar irrespective of the position in which the grinding wheel is adjusted.

The grinding unit D is mounted upon the sliding carriage 16 which traverses lengthwise of the carrying arm C to provide horizontal adjustment of the grinding unit with respect to the chuck jaw faces. This carriage in general is in the form of a flat plate having on its inner face a beveled or undercut groove or channel 17 which is engaged by correspondingly beveled ribs 18 formed on the face of the arm to provide an interlocked sliding connection between the carriage and the arm. The carriage also has a lug 19 which extends into a lengthwise groove 20 in the arm. An adjusting screw 21 extends through this lug 19 in threaded connection therewith and along the groove 20 of the arm and provides means for shifting the carriage in either direction for adjustment purposes. This adjustment screw is mounted in bearings 22 and 23 at the inner and outer ends of the arm. The outer end of the screw is provided with a hand crank 24 by which it may be conveniently rotated.

The motor grinding unit is mounted upon a sub-base consisting of the two parts 25 and 26 which are slidably connected for relative longitudinal movement for the purposes of further adjustment of the motor grinding unit. As shown in Figs. 2 and 3, members 25 and 26 have a beveled groove and tongue connection 27 which provides an interlocked sliding connection between the two parts. Member 25 has an extension 28 having a bearing 29 at its end for an adjustment screw 30, and this screw has threaded connection through the end portion of the base member 26. A hand crank 31 is provided on the outer end of the screw for the purposes of conveniently operating the screw to shift the motor.

The sub-base is mounted upon the carriage for rotary movement in order to provide angular adjustment of the grinding unit with respect to the faces of the chuck jaws. The face of the carriage 16 has a circular pad 32 which forms a flat bearing for a similar pad 33 on the sub-base member 26, and it also has outstanding therefrom a center pin 34 which extends into a bearing in the base member 26 of the motor unit, as shown more clearly in Figs. 1 and 3, thus the motor unit may be rotatably adjusted about the center pin 34 for positioning the grinding wheel at different angles with respect to the chuck jaw faces, as indicated in dotted lines in Fig. 1. A set screw 35 extends through the base member 26 into engagement with the center pin 34 by which the unit may be fastened or locked in any position to which it is rotatably adjusted. The flat bearing pads 32 and 33 are of the same diameter and their peripheries are marked with calibrations 37, Fig. 3, for indicating the angular adjustment of the grinding wheel.

The motor grinding unit itself comprises a suitable power motor 36 having a grinding wheel 15 at one end. In the present structure, the motor is of air driven type having the grinding wheel mounted at one end on its shaft and having at the opposite end of its housing a handle or grip 38 by which it may be conveniently handled in moving it to its different adjusted positions. This motor unit is secured to its base member 25 by means of the clamps 39 which embrace the motor housing at two points. These clamps have wing nuts 40 operating on the clamping bolts 41 so that the motor unit can be conveniently mounted in place or removed therefrom as desired.

When the jaws of the boring mill are to be faced or ground, the jaw holding ring is placed in position and the jaws are closed against the ring. The main supporting arm C of the grinding mechanism is mounted on the boring bar B, as hereinbefore described, the grinding mechanism being thus held in a fixed position against movement or rotation. The motor driven grinding wheel is then shifted to grinding position with respect to the jaws by means of its various adjustments on the main arm C, and the table A is rotated by its own driving means to bring the jaws successively into grinding position so that all the jaws will be ground alike and in true, accurate, concentric and level relation to the boring mill whereby they will hold the car wheel in exact relation to the center boring operations.

The grinding wheel dressing attachment E is mounted upon the main supporting arm C and comprises in general a bracket and a cutting tool holder detachably mounted upon a post 45 on the upper side of the arm C. The post 45 has a flange 46 at its lower end which is fastened to a pad 47 on the arm C by means of the screws 48. The bracket comprises two parts or members 49 and 50. The member 50 has a sleeve 51 through which the post 45 extends. This provides a vertical adjustment for the bracket to position the cutting tool relatively to the wheel to be dressed. This sleeve 51 of the bracket is locked in its adjusted position on the post by means of a set screw 52 which extends through the wall of the sleeve and into engagement with the post 45. The post has a keyway or slot 53 which is engaged by the inner end of the set screw to lock the bracket against rotation. The bracket member 49 is pivotally connected with the bracket member 50 so that the dressing tool can be swung upwardly out of the way while the grinding unit is in operation.

As shown in Figs. 4 and 5, the bracket member 49 is divided or split at one end and receives between these divisions 55 the portion 56 of the bracket member 50. A pivot bolt 57 extends through the divisions 55 and the portion 56, and is provided with a suitable clamping nut 58 on its threaded end to clamp the parts of the bracket in any position to which the bracket member 49 is adjusted. The outer end of the bracket member 49 has a sleeve 59 in which the shank 60 of the tool holder 61 is both rotatable and axially adjustable. The tool holder shank 60 has a lengthwise slot or keyway 62 and is provided with collars 63 having set screws 64 which engage the keyway. These collars bear against the ends of the sleeve and hold the tool holder against longitudinal movement, but they may be adjusted on the shank 60 to position the dressing tool in exact relation to the grinding wheel. A set screw 65 is provided in the sleeve for engagement with the slot in the tool holder shank for the purpose of locking the shank against rotation. The tool holder 61 has a suitable bore in which the cutting tool 66 is mounted. The parts are thus all adjustable and are arranged to be locked in their adjustable positions to present the cutting tool in exactly the proper position with respect to the grinding wheel. In Fig. 6 the cutting tool is shown as positioned to dress the grinding wheel with a flat grinding face. If, however, it is desired to form the grinding face of the wheel as a curve 67, as indicated in dotted lines in Fig. 7, the set screw 65 is loosened so that the tool holder can be rotated about the axis of its shank and by rotating the cutting tool transversely of the grinding wheel 15, as indicated in dotted lines in Fig. 7, the wheel can be given a curved or grooved grinding face.

In order to position the grinding wheel with respect to the dressing attachment, the grinding unit is first rotated on its pivot 34 until its axis is in horizontal position on the arm C and the wheel is in a vertical plane. The unit is then shifted lengthwise of the arm C until its peripheral face is presented to the dressing tool. If the face of the wheel is to be dressed flat, as shown in Fig. 6, the carriage 16 can be traversed to move the wheel on a straight line with respect to the cutting tool. If, on the other hand, the wheel is to be given a curved or grooved grinding face, the wheel may be held stationary and the cutting tool rotated on the axis of the tool holder shank, as shown in Fig. 7.

It is desirable to check the accuracy of the gauge ring 4 for concentricity and level from time to time. For this purpose, I provide an arm 70 detachably mounted on the main arm C and extending in the opposite direction. This arm serves as a support for a depending adjustable L-shaped rod 71 on the end of which a suitable gauge 72 is pivotally mounted. The gauge can thus be positioned to contact the several faces of the gauge ring while it is clamped in the jaws and rotated by the boring mill table.

I claim:

1. The combination of a boring mill having a vertical boring bar and a rotary chuck having a series of radially movable clamping jaws, a holding ring adapted to hold the jaws in concentric relation to the axis of the boring bar, a jaw grinding device adapted to be detachably mounted on said boring bar and adapted to grind the gripping faces of the jaws as the jaws are successively brought into grinding relation thereto by the rotation of the chuck, said grinding device comprising a main supporting arm having means at one end for clamping the arm upon the boring bar, a grinding unit comprising a motor having a grinding wheel on its shaft, said grinding unit being mounted upon said arm with the axis of its shaft in a plane radial to the axis of the boring bar, and means for rotatably and bodily shifting the grinding unit in the plane of its axis to position the grinding wheel in grinding relation to the jaws.

2. The combination of a boring mill having a vertical boring bar and a rotary chuck having a series of radially movable clamping jaws, a holding ring adapted to hold the jaws in concentric relation to the axis of the boring bar, a jaw grinding device adapted to be detachably mounted on said boring bar and adapted to grind the gripping faces of the jaws as the jaws are successively brought into grinding relation thereto by the rotation of the chuck, said grinding device comprising a main supporting arm having means at one end for clamping the arm upon the boring bar, a grinding unit comprising a motor having a grinding wheel on its shaft, said grinding unit being mounted upon said arm with the axis of its shaft in a plane radial to the axis of the boring bar, means for rotatably and bodily shifting the grinding unit in the plane of its axis to position the grinding wheel in grinding relation to the jaws, said monuting comprising a carriage shiftable lengthwise of said supporting arm, and a sub-carriage rotatably mounted on said carriage in a vertical plane and having a member shiftable lengthwise of itself and carrying said motor grinding unit.

3. The combination of a car wheel boring mill having a vertical boring bar and a rotary chuck having a circular series of radially movable clamping jaws, a holding ring adapted to be clamped by the jaws and thereby hold the jaws in concentric relation to the boring bar axis, a grinding mechanism for successively grinding the faces of the jaws as they are rotated by said chuck and comprising a supporting arm detachably mounted on the boring bar extending horizontally beyond the chuck jaws, a motor driven grinding wheel unit carried by said arm, and means for bodily shifting the motor driven grinding unit on said arm to position the grinding wheel in any angular grinding relation to the faces of the jaws.

4. In a car wheel boring mill having a vertical boring bar and a rotary chuck having a circular series of radially movable clamping jaws, a holding ring adapted to be clamped by the jaws and thereby hold the jaws in concentric relation to the boring bar axis, and a supporting arm detachably mounted on the boring bar extending horizontally beyond the chuck jaws, the combination of a motor driven grinding wheel unit carried by said arm for successively grinding the faces of the jaws as they are rotated by said chuck, means for bodily shifting the motor driven grinding unit on said arm to position the grinding wheel in any angular grinding relation to the faces of the jaws, and a grinding wheel dressing device mounted on said arm to overlie the grinding wheel when said grinding wheel is moved angularly to engage the wheel dressing device.

HENRY IRWIN.

REFERENCES CITED

The following references are of record in the file of this patent:

UNITED STATES PATENTS

| Number | Name | Date |
|---|---|---|
| 753,911 | Pelstring | Mar. 8, 1904 |
| 810,903 | Blechschmidt | Jan. 30, 1906 |
| 1,579,691 | Durkee | Apr. 6, 1926 |
| 1,596,701 | Williams | Aug. 17, 1926 |
| 1,791,546 | Wise | Feb. 10, 1931 |
| 2,357,803 | Barrett | Sept. 12, 1944 |

Certificate of Correction

Patent No. 2,458,472.  January 4, 1949

HENRY IRWIN

It is hereby certified that errors appear in the printed specification of the above numbered patent requiring correction as follows:

Column 3, line 73, for the word "adjustment" read *adjusting*; column 6, line 49, for "monuting" read *mounting*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*